US011408162B2

(12) United States Patent
Cashatt

(10) Patent No.: US 11,408,162 B2
(45) Date of Patent: Aug. 9, 2022

(54) UNDERGROUND STORMWATER STORAGE SYSTEM

(71) Applicant: Civ-Con Products & Solutions, LLC, Lakeway, TX (US)

(72) Inventor: Judd Clayton Cashatt, Lakeway, TX (US)

(73) Assignee: Cir-Con Products & Solutions, LLC, Lakeway, TX (US)

( * ) Notice: Subject to any disclaimer, the term of this patent is extended or adjusted under 35 U.S.C. 154(b) by 0 days.

(21) Appl. No.: 16/516,072

(22) Filed: Jul. 18, 2019

(65) Prior Publication Data
US 2020/0040562 A1 Feb. 6, 2020
US 2021/0381215 A9 Dec. 9, 2021

Related U.S. Application Data

(60) Provisional application No. 62/852,562, filed on May 24, 2019, provisional application No. 62/714,475, filed on Aug. 3, 2018.

(51) Int. Cl.
E03F 1/00 (2006.01)
C02F 1/00 (2006.01)
E02B 11/00 (2006.01)
E03B 11/14 (2006.01)
C02F 103/00 (2006.01)

(52) U.S. Cl.
CPC .............. *E03F 1/002* (2013.01); *C02F 1/004* (2013.01); *E02B 11/00* (2013.01); *E03B 11/14* (2013.01); *C02F 2103/001* (2013.01)

(58) Field of Classification Search
CPC .... E03F 1/00; E03F 1/002; E03F 5/10; E02B 11/00; E03B 11/14

USPC ................. 210/747.2, 747.3, 170.03; 405/36
See application file for complete search history.

(56) References Cited

U.S. PATENT DOCUMENTS

| 5,234,286 A * | 8/1993 | Wagner | E03B 11/02 405/36 |
| 7,294,256 B2 * | 11/2007 | Happel | E03F 5/101 210/170.03 |
| 7,892,425 B2 * | 2/2011 | Generes | E03F 5/14 210/170.03 |
| 2008/0217257 A1 * | 9/2008 | Pank | E03F 5/14 210/747.3 |
| 2009/0255868 A1 * | 10/2009 | Allen, II | E03F 1/002 210/170.03 |
| 2011/0174706 A1 * | 7/2011 | Russell | E03B 1/04 405/36 |
| 2016/0160487 A1 * | 6/2016 | Wynne | E03F 1/002 210/170.03 |

* cited by examiner

Primary Examiner — Christopher Upton
(74) Attorney, Agent, or Firm — Tumey L.L.P.

(57) ABSTRACT

A system and method for an underground stormwater storage system which may comprise a pit, a structure, and a liner. The structure may be disposed within the center of the pit and surround by the porous backfill and wherein outlets are disposed on the crown of the structure. A liner may form the outer layer of the pit. A method for releasing stormwater may comprise capturing stormwater from a surface, containing the stormwater within a structure, releasing a volume of the stormwater from the structure and draining an additional volume of the stormwater from the crown of the structure from an outlet when the structure is capturing more stormwater than it is releasing.

12 Claims, 7 Drawing Sheets

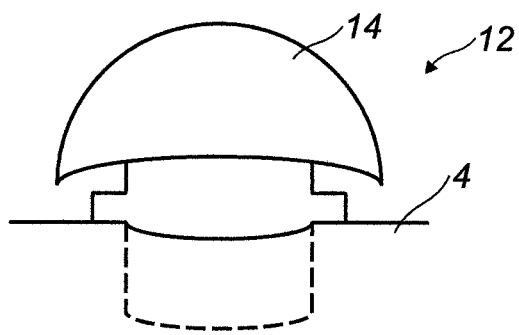
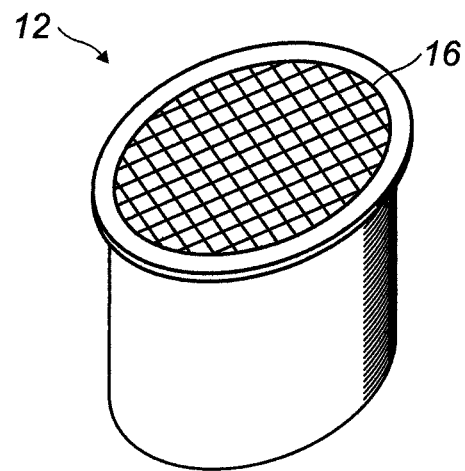
FIG. 4               FIG. 5
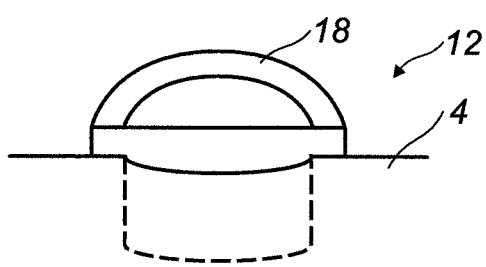
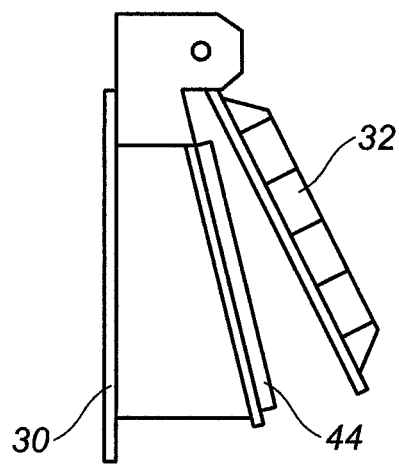
FIG. 6               FIG. 7

UNDERGROUND STORMWATER STORAGE SYSTEM

CROSS-REFERENCE TO RELATED APPLICATIONS

This application claims priority to U.S. Provisional Patent Application No. 62/714,475 filed Aug. 3, 2018, and U.S. Provisional Patent Application No. 62/852,562 filed May 24, 2019, the entire disclosures of which are incorporated herein by reference.

BACKGROUND

Embodiments relate generally to an underground stormwater storage system. More particularly, embodiments relate to a system in which stormwater may be captured and removed from an underground stormwater storage system through pipes and/or through outlets in the top-most regions of the system.

Current underground stormwater storage systems may be designed to capture and dispose of stormwater into an underground area. Surrounded by porous backfill, underground stormwater storage systems may often utilize void space within the porous backfill for added storage. The underground stormwater storage system may expel stormwater contaminated with sand and/or silt into porous backfill with each storm event. The expulsion of contaminated stormwater may deposit sand and/or silt and saturate the void space within the porous backfill, preventing attainment of full design storage volume. Overloading an underground stormwater storage system with clogged void space may prevent the underground stormwater storage system from operating properly, which may lead to stormwater pooling on the surface.

Current underground stormwater storage systems may expose in situ subgrade soils to moisture when subjected to minor volumes of storage. Soils susceptible to shrink and swell from varying moisture contents may reflect unwanted movement to pavements or structures at the surface. Liners may be used to protect subgrade soils, but may not be properly installed or inspected for complete watertightness. In an effort to prevent the overloading of an underground stormwater storage system and minimize unwanted movement of subgrade soils, improvements to an underground stormwater storage system may be desired.

BRIEF DESCRIPTION OF THE DRAWINGS

These drawings illustrate certain aspects of some of the embodiments of the present invention and should not be used to limit or define the invention.

FIG. 4 illustrates an embodiment of an outlet;

FIG. 5 illustrates an alternative embodiment of an outlet of FIG. 4;

FIG. 6 illustrates an outlet with an attachment point;

FIG. 7 illustrates an embodiment of an aperture with an open one-way valve employing a gasket;

DETAILED DESCRIPTION

Embodiments relate generally to an underground stormwater storage system. More particularly, embodiments relate to an underground stormwater storage system which may capture stormwater and expel excess stormwater through outlets. The outlets may be disposed on the uppermost areas of the underground stormwater storage system. In embodiments, an underground stormwater storage system may comprise a structure that may be designed to collect stormwater and release the stormwater underground at a controlled rate of speed. The structure may be buried within an engineered pit under pavement and/or soil. Stormwater may be collected and disposed within the underground stormwater storage system by drain pipes and/or a series of drain pipes. Occasionally, stormwater may be collected in excess due to a flood and/or heavy rain. Large amounts of stormwater may overload underground stormwater storage system, which may prevent stormwater from being removed from the surface. To prevent an overload of the underground stormwater storage system, outlets may be disposed along the top most regions of the underground stormwater storage system. This may allow the water to flow out of the underground stormwater storage system and into an engineered pit in which the underground stormwater storage system is buried. Larger stones, rocks, and dirt may be porous and comprise void areas in which stormwater expelled from the underground stormwater storage system may be disposed, allowing the underground stormwater storage system to continue to function properly.

Figure 1:
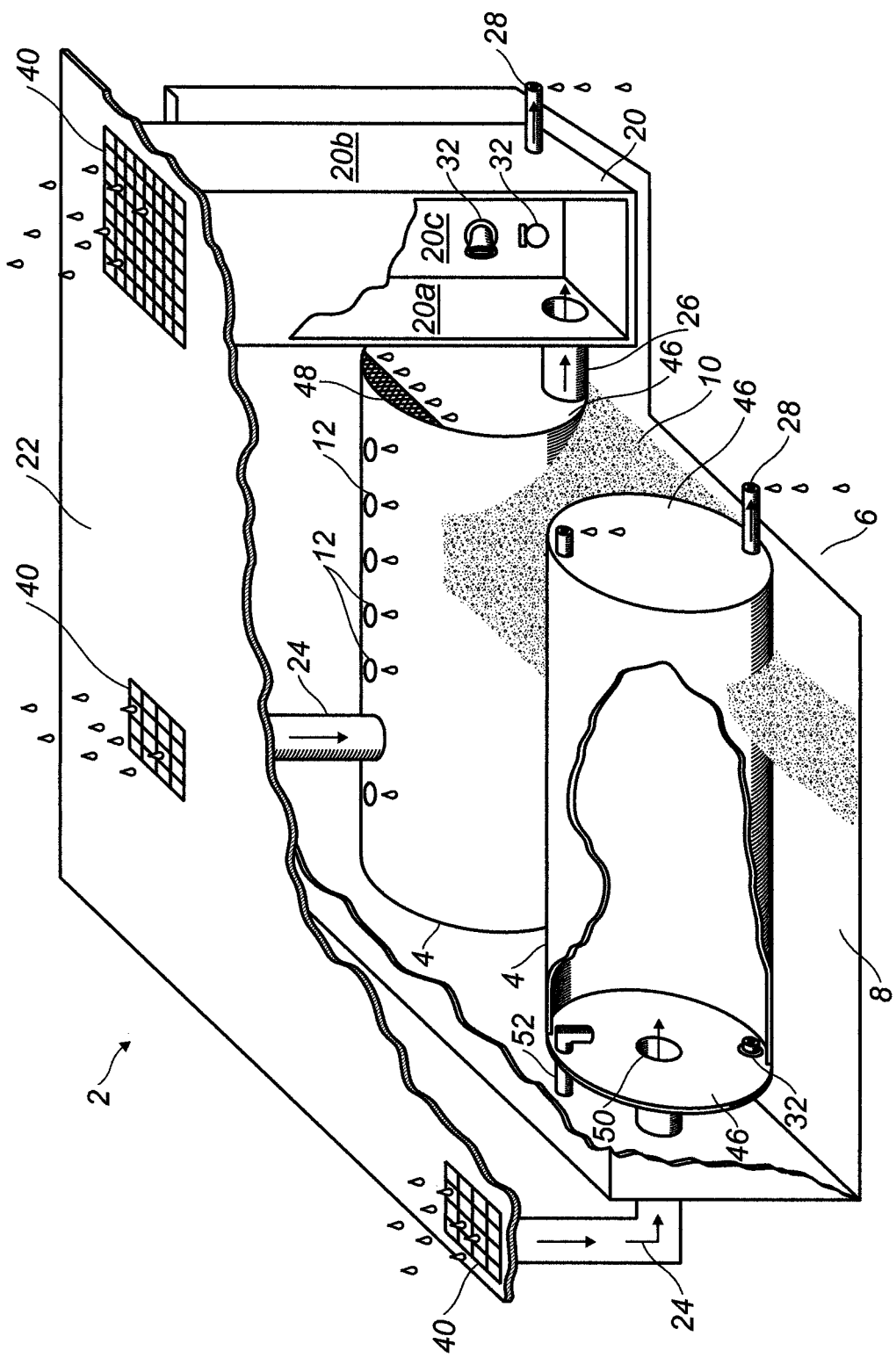
FIG. 1 illustrates a perspective view of an underground stormwater storage system.

As illustrated in FIG. 1, an underground stormwater storage system 2 may comprise a structure 4, a pit 6, and a porous backfill 10. In embodiments, the pit 6 may be dug and/or created in any area in which stormwater may need to be collected and disposed of slowly overtime. Areas may include areas where concrete and/or pavement may be used, such as within a city. During rains, concrete and/or pavement may have a tendency to shed and/or collect stormwater. This may prevent stormwater from dissipating into the soil. Additionally, this may cause stormwater to pool and/or overfill natural stormwater collection areas such as rivers, bayous, and/or lakes. The underground stormwater storage system 2 may be designed to collect, store, and release stormwater within the structure 4. In embodiments, there may be a plurality of the structures 4 that may be attached to one another to form the underground stormwater storage system 2. The structure 4 may comprise any suitable cross-sectional shape; a suitable shape may be, but is not limited to a circle, an arch, a square, a rectangle, and/or any combination thereof. Additionally, structure 4 may be of a single radius or a multi-radius shape. In embodiments, the structure 4 may be any suitable material in which to house stormwater underground. Suitable material may be, but is not limited to, plastic, concrete, metal, fiberglass and/or any combination thereof. The structure 4 may further comprise ribbing, not illustrated, which may add additional strength to structure 4. Once secured underground, the structure 4 may be able to retain and expel stormwater at any engineered rate of speed. When large amounts of stormwater are collected by the underground stormwater storage system 2, the rate of speed in which stormwater may be expelled from the structure 4 may not be fast enough to allow for the stormwater to move through the underground stormwater storage system 2, which may cause stormwater to collect and back up within the structure 4. As stormwater is collected in the structure 4, the stormwater level in the structure 4 may rise. In embodiments, stormwater may rise to the top of the structure 4. Outlets 12 may be used to expel water out of the structure 4, which may allow the underground stormwater storage system 2 to continue the disposal of stormwater from a surface 22.

Figure 2:
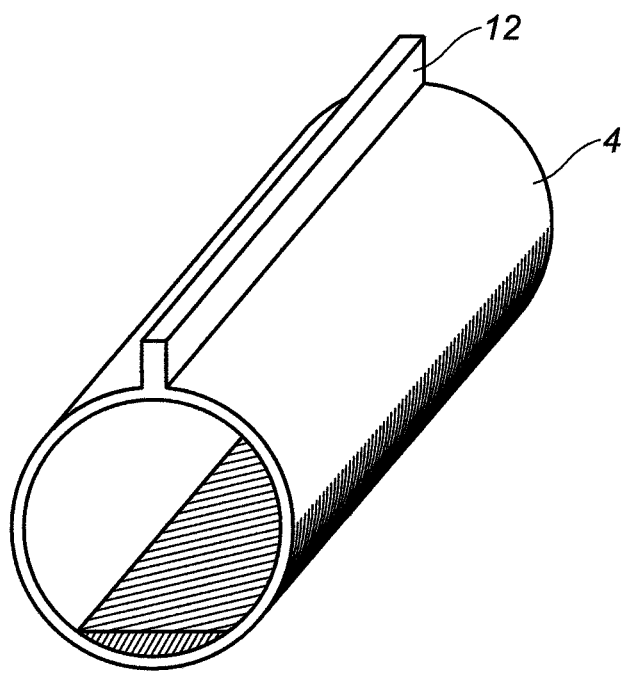
FIG. 2 illustrates a perspective view of a structure and an outlet.
Figure 3:
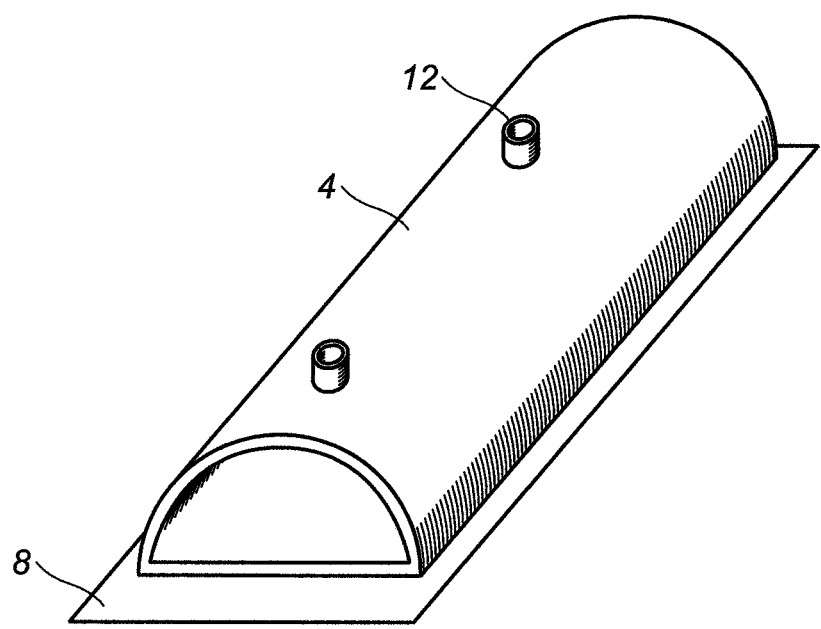
FIG. 3 illustrates a perspective view of an alternative embodiment of a structure and an alternative embodiment of an outlet from FIG. 2.

FIGS. 2 through 4 illustrate embodiments in which the structure 4 may comprise outlets 12, which may be disposed on an area of the structure 4 closest to the surface. Outlets 12 may be disposed about the crown and/or top of the structure 4 and may further be disposed in any area above the spring line or midrise of the enclosed structure 4 or within the crown and/or haunch of the arch of the structure 4. The spring line may be defined as the line at which an arch begins. Outlets 12 may comprise any suitable shape; a suitable shape may be, but is not limited to, a square, rectangle, oval, circle, polyhedron, and/or any combinations thereof. Additionally, referring to FIG. 2, outlets 12 may be a slot, for example, that traverses the length of the structure 4 and extends up and away from the structure 4 by any suitable length. A suitable length may be as long as about one inch to about twelve inches, about four inches to about ten inches, about six inches to about eight inches, or about six inches to about twelve inches. As illustrated in FIGS. 2 through 4, outlets 12 may be disposed along the crown, a side of the structure 4, and/or on top of the structure 4. Without limitation, outlets 12 may be disposed in any area above the spring line of the structure 4. Additionally, outlets 12 may be a single outlet or a plurality of outlets 12. Outlets 12 may be disposed adjacent to one another and may be disposed in random patterns, straight lines, and/or offset from each other. The plurality of outlets 12 may further be disposed above the spring line of the structure 4. Outlets 12 may function to delay the expulsion of stormwater from the structure 4 until large amounts of stormwater are collected within the structure 4. The structure 4 may collect and/or hold stormwater due to the ability of the structure 4 to retain stormwater.

An enclosed structure, as illustrated in FIGS. 2 and 4, may be sufficiently water tight and may be able to collect stormwater. In embodiments, referring to FIG. 3, the structure 4 may not be an enclosed structure. A liner 8 may be used to prevent stormwater from dissipating into the porous backfill 10 (not illustrated) continuously. The porous backfill 10 may be, but is not limited to, gravel, limestone, dolomite, stone, shale, and/or any combination thereof. Shaped as an arch, the structure 4 may comprise an open bottom. With an arched structure 4, the liner 8 may act as a bottom to the structure 4 and sufficiently seal the arch. This may prevent stormwater from dissipating into the pit 6 (not illustrated), which may deposit sand and/or silt within the porous backfill 10, making the porous backfill 10 impervious to stormwater. The saturation of the porous backfill 10 with sediment may clog the underground stormwater storage system 2, which may cause stormwater to back up and prevent stormwater from dissipating properly in the underground stormwater storage system 2. The liner 8 may contain sand and/or silt, preventing it from saturating the porous backfill 10. The structure 4 may be configured to allow operators to remove sand and/or silt deposited within the structure 4. By removing deposited sand and/or silt, the structure 4 may be able to increase the amount of stormwater the structure 4 may be able to retain. In instances where large amounts of stormwater are captured, sand and/or silt may settle to the bottom of the structure 4. This may allow stormwater, void of sand and/or silt, to move upward within the structure 4. Clean stormwater may then be free to move through outlets 12 and flow into the porous backfill 10. Clean stormwater may not deposit sand/silt into the porous backfill 10 and may allow an engineer to take into account void areas within the porous backfill 10 in stormwater storage calculations.

In embodiments, outlets 12 may be utilized during storm events in which large amounts of stormwater may be collected by the stormwater storage system 2. Events in which large amounts of stormwater may be collected may rarely occur. This may further prevent the expulsion of sand and/or silt, disposed within the structure 4, into the porous backfill 10. Additionally, preventing the expulsion of water into the porous backfill 10 may further prevent the exposure of subgrade soils to moisture, which may lead to the swelling and shrinkage, erosion and/or removal of subgrade soils. In embodiments, outlets 12 may be designed to allow for the release of stormwater into the porous backfill 10, but may further prevent the porous backfill 10 from entering the structure 4.

Outlets 12 may be configured to allow stormwater to be expelled from the structure 4 and prevent the porous backfill 10 from falling into the structure 4. Outlet 12 may be inserted into the structure 4 before and/or after placement of the structure 4 within the pit 6. Additionally, outlets 12 may be removable from the structure 4 and may be replaced. As illustrated in FIGS. 5 through 8, outlets 12 may comprise different embodiments and/or shapes to prevent the porous backfill 10 from falling through outlets 12 into the structure 4. Referring to FIG. 4, outlets 12 may comprise a cover 14. In embodiments, the cover 14 may have a domed shape, which may allow stormwater to move up and out of outlets 12 under the dome shape, while the top of the dome prevents the porous backfill 10 from falling into outlets 12. The cover 14 may be made of any suitable material; suitable material may be, but is not limited to, metal, plastic, concrete and/or any combination thereof. The cover 14 may partially cover outlets 12 and/or completely cover outlets 12. Additionally, the cover 14 may comprise partial hemispherical structures, which may be used to prevent the porous backfill 10 from moving through outlets 12 and may allow stormwater to move through the cover 14. Referring to FIG. 5, outlets 12 may comprise a screen 16, which may cover the entirety of outlets 12. The screen 16 may be made of any suitable material; suitable material may be, but is not limited to, metal, plastic, and/or any combination thereof. In embodiments, the screen 16 may be a mesh material, which may comprise a plurality of sections in which stormwater may pass through. The mesh design may prevent large-diameter porous backfill 10 from entering the structure 4, but it may allow stormwater to pass through and be removed from the structure 4. In embodiments, there may be any suitable number of screens 16 disposed on outlets 12. A suitable number of screens 16 may be from about one to about six, about two to about four, or about three to about six. Further, outlets 12 may comprise an attachment point 18 as illustrated in FIG. 6.

FIG. 6 illustrates outlets 12 with the attachment point 18. Attachment point 18 may be any suitable shape; a suitable shape may be a hook, a bar, an arch, and/or any combination thereof. In embodiments, attachment point 18 may be used to connect outlets 12, and thus the structure 4, to a crane and/or other lifting mechanism. Attachment point 18 may allow the structure 4 to be positioned within the pit 6 for use. In embodiments, attachment point 18 may comprise the same material as outlets 12. Additionally, attachment point 18 may be removable from outlets 12 after installation of the structure 4.

Figure 8A:
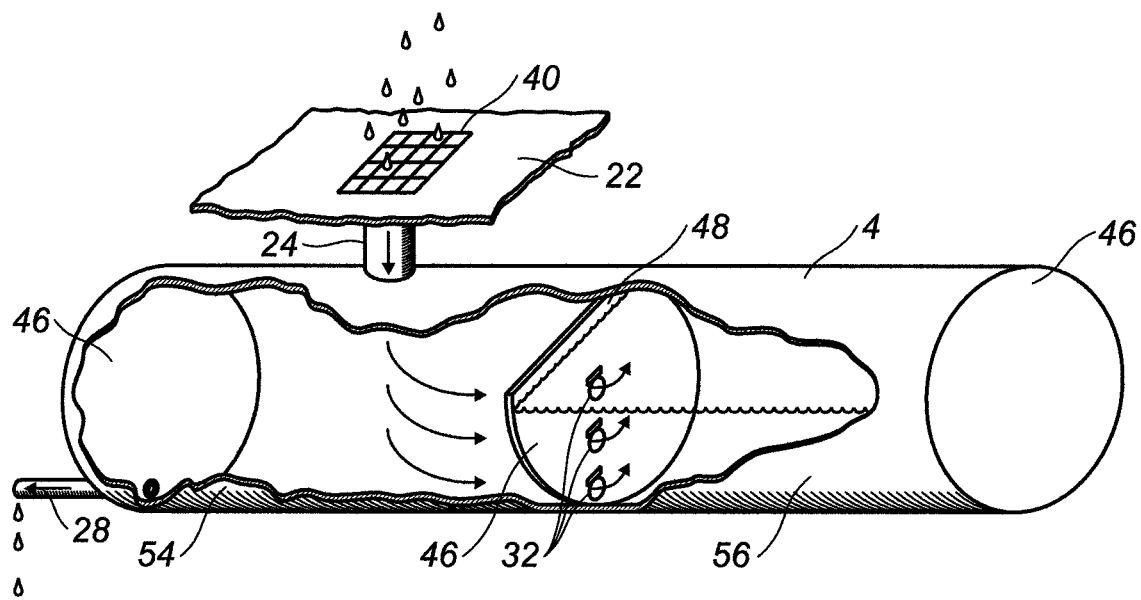
FIG. 8A illustrates a perspective view of an alternative embodiment of a stormwater storage system.
Figure 8B:
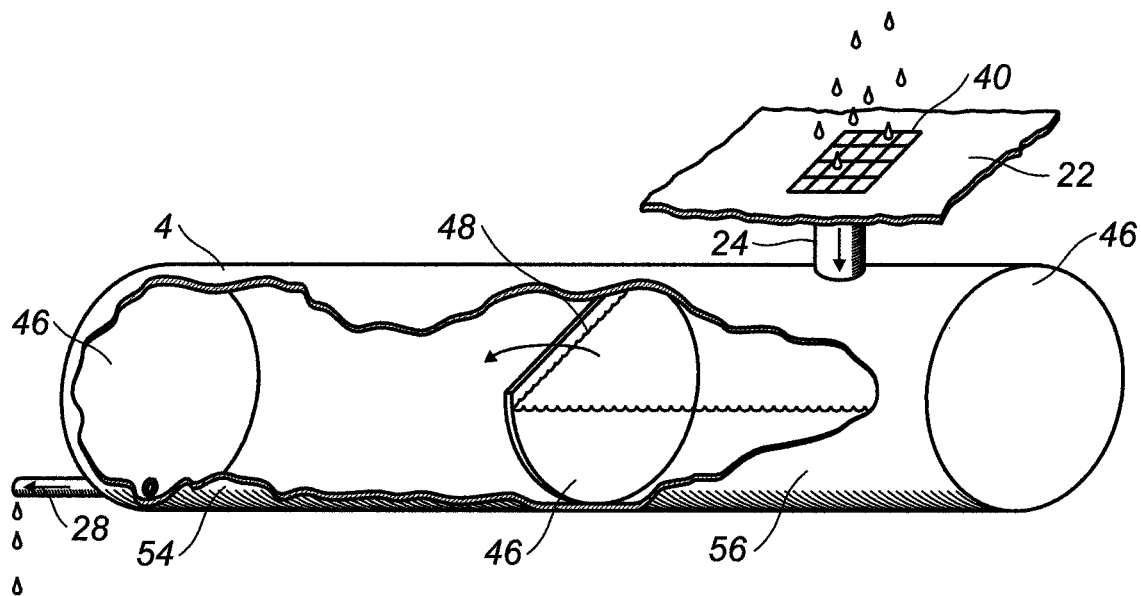
FIG. 8B illustrates a perspective view of an alternative embodiment of a stormwater storage system.

FIG. 8 illustrates an embodiment of a round structure 4 with various outlets 12. As previously described, outlets 12 may be a slot and/or hole. As shown, outlets 12 may comprise the screen 16 that allows stormwater to pass through it. Outlets 12 may be disposed as a vertical slot about a top portion of the structure 4. In embodiments, outlets 12 may extend along the length of the structure 4. Alternatively, outlets 12 may be disposed as a hole along the top portion of the structure 4.

Returning to FIG. 1, FIG. 1 illustrates an embodiment with an outlet control structure 20. FIG. 1 also shows the surface 22, one or more inlet pipes 24, a connector pipe 26, and an outfall pipe 28. The surface 22 may be cement, grass, asphalt, concrete pavement, or types of pavement, or any other ground cover. The one or more inlet pipes 24 may connect the surface 22, directly or indirectly, to the structure 4. For example, there may be a grating 40 on the surface 22 that allows stormwater to flow into the structure 4, wherein the one or more inlet pipes 24 may be connected to the structure 4. The one or more inlet pipes 24 may be any size and made from any material required for the particular circumstances. For example, in embodiments the one or more inlet pipes 24 may be made from high-density polyethylene (HDPE), corrugated metal, reinforced concrete, polyvinyl chloride (PVC), polypropylene (PP), fiberglass, or other piping materials. Further, in embodiments, the one or more inlet pipes 24 may have any diameter and may be of about 15 inches to 30 inches, 24 inches to 48 inches, 6 inches to 18 inches, and 42 inches to 96 inches. The connector pipe 26 may connect the outlet control structure 20 to the structure 4. The connector pipe 26 may be any size and made from any material required for the particular circumstances and may be about 12 inches to 48 inches. In embodiments, the outfall pipe 28 may connect the outlet control structure 20 to an area for drainage. The outlet pipe 28 may be any size and made from any material required for the particular circumstances. For example, in embodiments, the outfall pipe 28 may be made of HDPE, metal, concrete, PVC, PP, or fiberglass, and in embodiments, the outfall pipe 28 may have a diameter of about 6 inches to 48 inches.

As illustrated in FIG. 1, in embodiments, the outlet control structure 20 may be a rectangular column. Additionally, the outlet control structure 20 may be a column of any shape such as, but not limited to, squared or circular. The outlet control structure 20 may have a height greater than the height of the structure 4. Further, the outlet control structure 20 may comprise an aperture 30 with a one-way valve or valve 32. In embodiments, the outlet control structure 20 may connect to the connector pipe 26 on a wall 20A of the outlet control structure 20. In embodiments, the outlet control structure 20 may connect to the outfall pipe 28 on a wall 20B of the outlet control structure 20. The aperture 30 may have any shape including, but not limited to a rectangular shape, circular shape, or oval shape. In embodiments, the aperture 30 may be located near the bottom of one of the walls of the outlet control structure 20. For example, the aperture 30 may be located on a wall 20C of the outlet control structure 20. The one-way valve 32 may be of any shape or material. In embodiments, it may have a circular shape and made of steel or it may be oval in shape and made of rubber. In embodiments, the one-way valve 32 may be hingedly attached to the top of the aperture 30 or it may be flanged and screwed, bolted, welded or otherwise adhered over aperture 30. The one-way valve 32 may be attached to the outlet control structure 20 in such a way that gravity may assist with inclining the one-way valve 32 towards a closed position. Alternatively, in embodiments, the one-way valve 32 may be positioned at an angle to increase the effect of gravity. As illustrated in FIG. 7, in embodiments, the one-way valve 32 may comprise a gasket 44 or some other similar material for the purpose of decreasing the ability for water to leak through the one-way valve 32. Alternatively, the gasket 44 may be placed inside around the aperture 30 such that the one-way valve 32 may press against the gasket 44 when in or near the closed position.

As illustrated in FIG. 1, in embodiments the outfall pipe 28 may connect to the outlet control structure 20 near the bottom of the outlet control structure 20 in order to improve water drainage. The outfall pipe 28 may be sized to restrict water flow.

In the event of a rainstorm, the following operation of an embodiment of the stormwater storage system 2 may occur. Rain may fall on the surface 22. The stormwater may flow from the surface 22 to the structure 4 by way of the one or more inlet pipes 24, directly or indirectly. As the stormwater flows to the structure 4, the stormwater begins to fill the structure 4, as well as the connector pipe 26 and the outlet control structure 20. The water in the structure 4, the connector pipe 26, and the outlet control structure 20 may have substantially similar head pressures. At this point in the operation, the one-way valve 32 may be inclined to the closed position due, in part, to gravity. The surrounding porous backfill 10 may be relatively dry.

As the water levels in the structure 4, the connector pipe 26, and the outlet control structure 20 rise, the head pressure within the outlet control structure 20 may increase, which may place increased pressure on the one-way valve 32 to prevent the flow of stormwater into the porous backfill 10.

In the event of a small or medium-sized rainstorm, the storage system 2 may fill partially and discharge the rain water at a given rate. In such instances, the backfill 10 may not be needed or used. In the event of a large storm event, the structure 4 may be completely filled with water and may allow water to escape or discharge out of the outlets 12 into the surrounding porous backfill 10. The water discharging out of the outlets 12 may be potentially cleaner than the water in the structure 4 given that large sediments may be deposited at the bottom of the structure 4. As the rain continues, the water level in the backfill 10 may continue to rise. The water level in the backfill 10 may rise to less than, equal to, or greater than the height of the structure 4.

When the large storm event begins to subside and water is no longer entering the storage system 2, the water level, and thus the head pressure, within the structure 4 and the outer control structure 20 may begin to decrease. A lower head pressure inside the outer control structure 20 may create a differential head pressure between the head pressure inside the outer control structure 20 and the head pressure outside the outer control structure 20 in the backfill 10. This differential head pressure may move the one-way valve 32 from a closed position to an open position, as illustrated in FIG. 12, allowing water to drain from the backfill 10 into the outer control structure 20. The water may continue to drain from the backfill 10, the structure 4, and the outer control structure 20 until the storage system 2 may be substantially drained of water and relatively dry.

Alternatively, the one-way valve 32 may be employed on a wall of the structure 4. For example, as illustrated in FIG. 1, in one embodiment, there may be two or more structures 4, side by side, in a horizontal position underground. These two structures 4 may be connected by an equalizing pipe 34 (not illustrated). In embodiments, as illustrated in FIG. 1, the structure 4 may be a round pipe. In embodiments, the structure 4 may comprise a reinforced bulkhead 46 at one end of the structure 4. At the top of the reinforced bulkhead 46, the structure 4 may comprise an opening 48, as illustrated in FIG. 1. In embodiments, the opening 48 may comprise a wire mesh. Further, in embodiments, the wire mesh may be 0.5-inch galvanized wire mesh. In the embodiment illustrated in FIG. 1, the reinforced bulkhead 46 further comprises the aperture 30 near the bottom. In embodiments, the aperture 30 may be round. In embodiments, a one-way valve 32 may be hingedly attached to the reinforced bulkhead 46 in such a way as to cover aperture 30 when the one-way valve 32 is in the closed position. In embodiments, the one-way valve 32 may have a diameter of 6 inches. In embodiments, the elevation of the one-way valve 32 may vary. Further, in embodiments, the one-way valve 32 may be covered by a sleeve (not illustrated) extending out from the reinforced bulkhead 46. In embodiments, the outfall pipe 28 may lead to a capped perforated riser 36 (not illustrated) in a sewer system 38 (not illustrated). In embodiments, there may be any number of structures comprising the storage system 2.

As illustrated in FIG. 1, reinforced bulkhead 46 may have an inlet control structure 50 as well as inverted pipe 52, which may address problems with trash in the structure 4. Other alternatives may include a redundant one-way valve 32 at higher elevations, riser filters, floc logs baskets, and trash baffles. Further, the storage system 2 may be used with pre/post treatment devices. In embodiments, structure 4 may have more than one one-way valve 32. In embodiments, the outlet control structure 20 may have more than one one-way valve 32. In embodiments, the structure 4 and the outlet control structure 20 may each have one or more one-way valves 32. As discussed above, in embodiments, outlets 12 may be inverted pipe 52 with the downward inlet located within structure 4 or within outlet control structure 20 whereby trash, debris, oils, hydrocarbons or other floatable pollutants may rise above the downward facing inlet to prevent expulsion into porous backfill 10.

As illustrated in FIG. 15A, in another embodiment, structure 4 may comprise an additional reinforced bulkhead 46 internally. The additional reinforced bulkhead 46 may comprise one or more one-way valves 32, and it may also comprise an opening 48. In operation, stormwater flows into a portion of structure 4 referred to as a detention system 54. As the level of stormwater in detention system 54 increases, the stormwater forces the one-way valves 32 open allowing stormwater to flow into a portion of structure 4 referred to as a cistern 56. The opening 48 allows air to escape the cistern 56. Additionally, the opening 48 may also allow stormwater to flow from detention system 54 into cistern 56, which may allow silt and trash to remain in the detention system 54. Stormwater may also exit the detention system 54 by way of outfall pipe 28. The stormwater stored in cistern 56 may be employed for use in irrigation or other applications. Multiple cisterns 56 may be created throughout the system 2 and may be connected to one another with sufficiently watertight pipe or other connections to allow equal filling from rainfall harvesting and draining from irrigation or other use.

Alternatively, as illustrated in FIG. 15B, the stormwater may flow directly into cistern 56. In this embodiment, opening 48 allows stormwater overflow to flow into the detention system 54.

Figure 9:
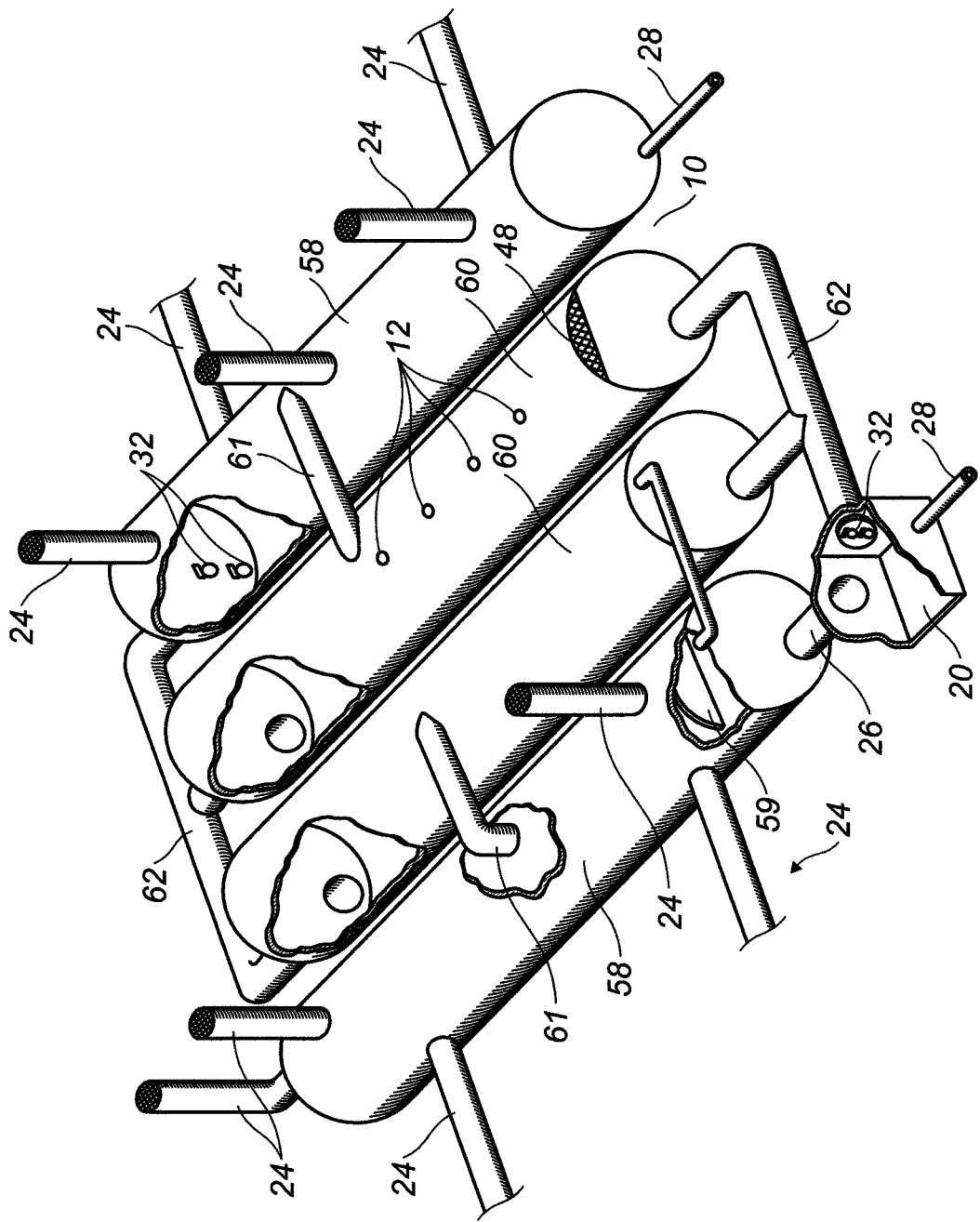
FIG. 9 illustrates an alternative embodiment employing treatment chambers 50 and storage chambers 52.

FIG. 9 illustrates an alternative embodiment employing treatment chambers 58 and storage chambers 60. The embodiment of FIG. 9 may function similarly to the embodiment shown in FIG. 1, but the embodiment of FIG. 9 may preferentially discharge to storage chambers 60. Further, the embodiment of FIG. 9 may allow for the drainage of stormwater from storage chambers 60 back into treatment chambers 58 through one-way valves 32. In embodiments, stormwater enters the treatment chambers 58 through inlet pipes 24. In embodiments, a small rain storm and/or first flush runoff may be contained in the treatment chambers 58, and treatment chambers 58 may also capture sediment, trash, and other debris. In embodiments, as the amount of stormwater in treatment chambers 58 increases, the head pressure against the one-way valves 32 may increase, keeping the one-way valves 32 in the closed position. In embodiments, treatment chambers 58 must fill with stormwater to the top before spilling into the storage chambers 60. In embodiments, treatment chambers 58 may be connected to storage chambers 60 by one or more upper connector pipes 61. In embodiments, trash and other floatable debris may be prevented from entering storage chamber 60 by employing a downturned upper connector pipe 61, a baffle wall 59, or a screen. Further, storage chambers 60, in embodiments, may also be connected to treatment chambers 58 by return pipes 62. In embodiments, return pipes 62 may fill with stormwater at the same time storage chambers 60 fill with stormwater. In embodiments, one-way valves 32 in the bulkhead of treatment chamber 58 may prevent stormwater from entering treatment chamber 58 when the head pressure inside treatment chamber 58 exceeds the head pressure inside return pipe 62. In other embodiments, a return pipe 62 may be connected to an outlet control structure 20, wherein the outlet control structure 20 may also be connected to treatment chamber 58 by way of connector pipe 26. In such embodiments, the outlet control structure 20 may fill with stormwater when the treatment chamber 58 fills with stormwater, and the head pressure inside outlet control structure 20 may maintain the one-way valves 32 until the head pressure inside return pipe 62 exceeds the head pressure inside outlet control structure 20. In embodiments, as treatment chambers 58 drain through outfall pipes 28, directly or indirectly, the level of stormwater in treatment chambers 58 decreases, which may ultimately create a differential head pressure needed to open the one-way valves 32. In embodiments, once one-way valves 32 are open, the treatment chambers 58 and storage chambers 60 drain approximately simultaneously and substantially completely. This alternative embodiment may allow for easier maintenance since the trash, debris, and pollutants may be isolated, and it may allow for the use of filters, chemicals, and other finer treatment methods and devices. Further, this alternative embodiment may further protect the backfill 10 given that the backfill 10 may only receive the cleanest discharge from the tops of storage chambers 60 in very large storm events. Additionally, there may be other alternative embodiments in which a perforated pipe (not illustrated) may be set into or buried under backfill 10 for additional drainage. Further, in this alternative embodiment, a pump (not illustrated) may be employed to assist with this additional drainage.

Figure 10A:
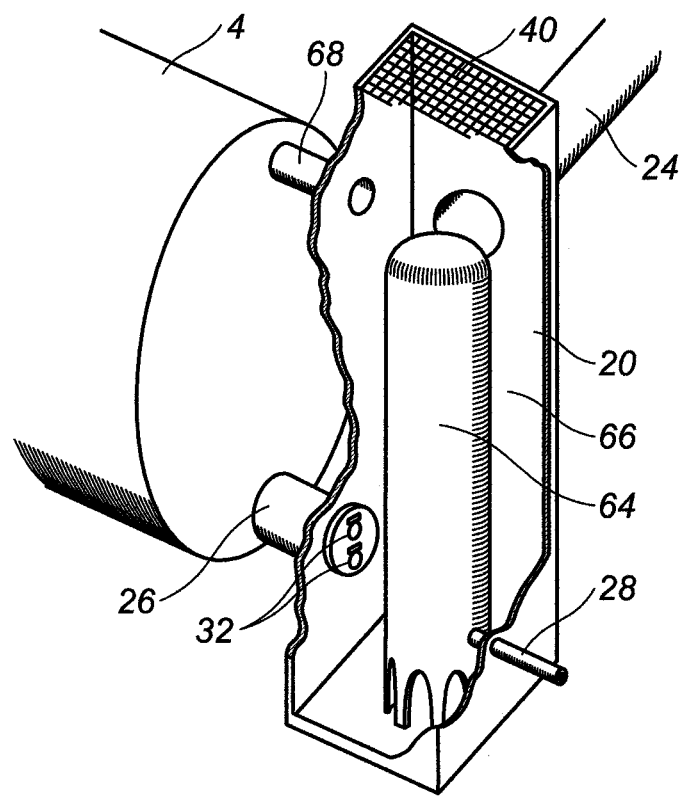
FIG. 10A illustrates an embodiment of a bell siphon employed with a stormwater storage system.
Figure 10B:
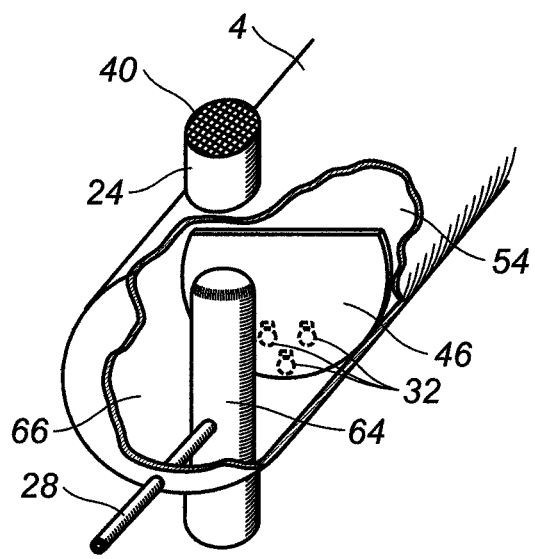
FIG. 10B illustrates an alternative embodiment of a bell siphon employed within a stormwater storage structure comprising a bulkhead within a detention structure.
Figure 10C:
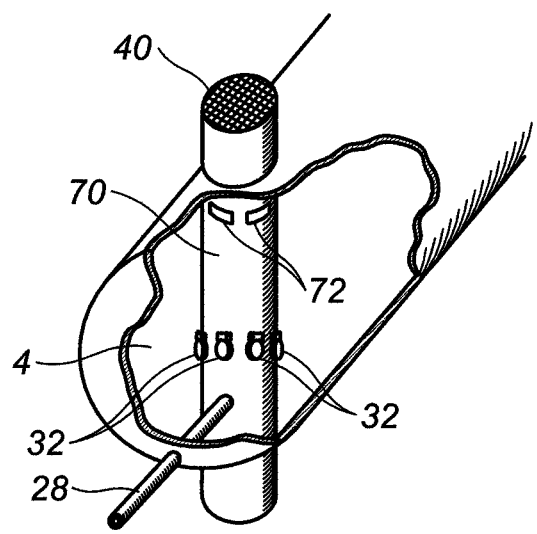
FIG. 10C illustrates an alternative embodiment employing an internal inlet riser for housing a siphon.

FIGS. 10A-10C illustrate embodiments of bell siphons 64 that may be employed to assist with stormwater drainage. In the embodiment of FIG. 10A, a small volume of an outlet control structure 20 may be dedicated to fill very quickly during a storm event. This small volume may be referred to as the siphon area 66 in embodiments. In embodiments, the siphon area 66 may comprise one or more inlet pipes 24 and grating 40. In embodiments, the siphon area 66 may begin filling up with stormwater before the structure 4. In embodiments, as the amount of stormwater in siphon area 66 increases, the head pressure inside the siphon area 66 increases forcing the one-way valves 32 to remain in the close position. In embodiments, when the stormwater reaches the required elevation to prime the siphon 64, stormwater may begin to discharge from the outfall pipe 28 of siphon 64. In embodiments, any excess water in the siphon area 66 may overflow into the detention structure 4 through an overflow pipe 68. In embodiments, as the stormwater outside of the siphon 64 draws down, the elevation of the stormwater in the siphon area 66 may decrease lower than the elevation in the detention structure 4, creating a differential head pressure, which may open the one-way valves 32. In embodiments, the siphon 64 may drain the entire system 2. FIG. 10B illustrates an alternative embodiment comprising a bulkhead 46 within detention structure 4 with one or more inlet pipes 24 or gratings 40. In the embodiment shown in FIG. 10B, the siphon area 66 may be inside structure 4. Further, any overflow of stormwater may flow over bulkhead 46 similar to the embodiment shown in FIG. 8A. FIG. 10C illustrates another alternative embodiment employing an internal inlet riser 70 for housing siphon 64 (not illustrated). In embodiments, any overflow in the embodiment of FIG. 10C may flow out of inlet riser 70 through openings 72 at the top of inlet riser 70 into structure 4. In embodiments, siphon 64, a hydrobrake, or other flow-control device that may benefit from increased head pressure may be placed within the siphon area 66. In embodiments, the benefit of employing a siphon 64 may be that, once primed, siphons operate at a nearly constant discharge rate versus a simple outlet orifice, which only reaches peak discharge when the system 2 is completely full of water. Further, the required detention volume may be the amount of water flowing into the system 2 less the amount of water flowing out of system 2. Thus, in embodiments, the siphon 64 may drain more water thereby reducing the amount of required storage volume.

Figure 11:
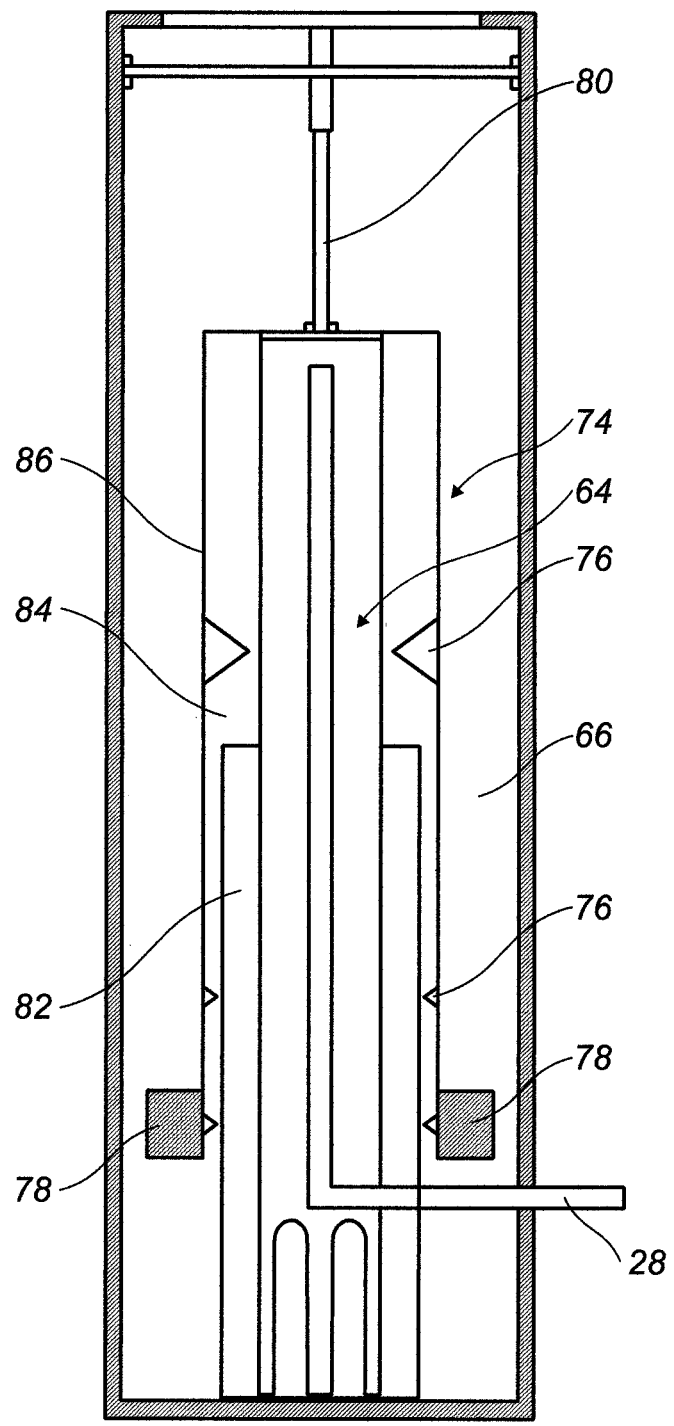
FIG. 11 illustrates the internal components of a double-bell siphon.

FIG. 11 illustrates the internal components of a double-bell siphon 74. In embodiments, the double-bell siphon 74 may comprise a siphon 64, guides 76, floats 78, a cup 82, and a warning indicator 80. In the embodiment of FIG. 11, stormwater may enter the siphon area 66 and enter the first area 84. In embodiments, when the stormwater reaches a level higher than cup 82, the stormwater may begin to fill cup 82. Further, in embodiments, as stormwater rises inside siphon area 66, floats 78 may cause a floating bell 86 to rise as well. Additionally, stormwater may also begin to fill siphon 64 in embodiments. In embodiments, when the stormwater reaches the required elevation to prime the siphon 64, stormwater may begin to discharge from the outfall pipe 28 of siphon 64. The benefit of this double-bell siphon alternative is that it may prevent sediment and debris from clogging the bottom of siphon 64. In embodiments, warning indicator 80 may be attached to the top of floating bell 86, and warning indicator 80 may exit an aperture in the surface 22. In embodiments, warning indicator 80 may warn property owners, property management, or other individuals that the siphon area 66 may contain excessive debris or have other issues, if the warning indicator 80 fails to return to its subsurface position after the storm has ceased for a reasonable amount of time.

The foregoing figures and discussion are not intended to include all features of the present techniques to accommodate a buyer or seller, or to describe the system, nor is such figures and discussion limiting but exemplary and in the spirit of the present techniques.

What is claimed is:

1. An underground stormwater storage system, comprising:
    an inlet pipe;
    a porous backfill, wherein the porous backfill comprises stones;
    a structure, wherein the structure comprises two bulkheads, wherein one bulkhead is disposed on each end of the structure, and further wherein the interior of the structure is capable of receiving and holding stormwater from the inlet pipe;
    an outlet, wherein the outlet is disposed above the midrise of the structure, wherein the outlet is capable of allowing stormwater to flow from the interior of the structure to the porous backfill; and
    a one-way valve, wherein the one-way valve is disposed in one of the bulkheads of the structure, and further wherein the one-way valve is capable of allowing stormwater to flow from the porous backfill into the structure.

2. The underground stormwater storage system of claim 1, wherein the outlet is disposed on the crown of the structure.

3. The underground stormwater storage system of claim 1, wherein the outlet comprises a cover.

4. The underground stormwater storage system of claim 1, wherein the outlet comprises a screen.

5. The underground stormwater storage system of claim 1, wherein the outlet comprises an opening disposed in a bulkhead.

6. The underground stormwater storage system of claim 1, wherein at least one of the bulkheads further comprises an outfall pipe, wherein the outfall pipe is disposed below the midrise of the bulkhead and further wherein the outfall pipe is sized to restrict water flow out of the structure and into the porous backfill.

7. An underground stormwater storage system, comprising:
    an inlet pipe;
    a porous backfill, wherein the porous backfill comprises gravel;
    a primary structure, wherein the primary structure comprises an open bottom, wherein the open bottom is in contact with the gravel of the porous backfill, an outlet, and a liner, wherein the liner is capable of delaying the flow of stormwater from the interior of the primary structure to the porous backfill, and further wherein the interior of the primary structure is capable of receiving stormwater from the inlet pipe;
    one or more additional structures, wherein the one or more additional structures are positioned adjacent to the primary structure, and further wherein the one or more additional structures are connected by a connector pipe to the primary structure; and
    a one-way valve, wherein the one-way valve is capable of allowing stormwater to flow into the primary structure.

8. The structure of claim 7, wherein the outlet is disposed on the crown of the primary structure.

9. The structure of claim 7, wherein the outlet comprises a slot, wherein the slot traverses the length of the primary structure.

10. The primary structure of claim 7, wherein the outlet comprises a screen.

11. The outlet of claim 10, wherein the screen comprises a mesh material.

12. The primary structure of claim 7, wherein the primary structure further comprises the shape of an arch.

\* \* \* \* \*